(12) United States Patent
Al Suwaidi

(10) Patent No.: US 9,741,247 B2
(45) Date of Patent: Aug. 22, 2017

(54) PARKING MONITORING SYSTEM

(71) Applicant: Abdulla Ebraheim Mohamed E. Al Suwaidi, Fujairah (AE)

(72) Inventor: Abdulla Ebraheim Mohamed E. Al Suwaidi, Fujairah (AE)

( * ) Notice: Subject to any disclaimer, the term of this patent is extended or adjusted under 35 U.S.C. 154(b) by 14 days.

(21) Appl. No.: 14/701,558

(22) Filed: May 1, 2015

(65) Prior Publication Data
US 2016/0321925 A1 Nov. 3, 2016

(51) Int. Cl.
*G08G 1/14* (2006.01)
*G08G 1/015* (2006.01)
*G08G 1/017* (2006.01)
*G06Q 30/02* (2012.01)

(52) U.S. Cl.
CPC .......... *G08G 1/015* (2013.01); *G08G 1/0175* (2013.01); *G08G 1/146* (2013.01); *G06Q 30/02* (2013.01); *G06Q 30/0203* (2013.01)

(58) Field of Classification Search
CPC .......... G08G 1/14; G08G 1/141; G08G 1/144; G08G 1/146; G08G 1/147; G08G 1/148; G08G 1/017; G07B 15/02; G06Q 30/02; G06Q 30/0203; G06Q 30/0206; G06Q 30/0207; G06Q 30/0237; G06Q 30/0259; G06Q 30/0268
See application file for complete search history.

(56) References Cited

U.S. PATENT DOCUMENTS

| | | | | |
|---|---|---|---|---|
| 8,390,477 B2* | 3/2013 | Noel, II | ................. | G08G 1/042 340/568.1 |
| 8,692,688 B1* | 4/2014 | Tuxen | ................... | B60Q 9/002 340/425.5 |
| 9,031,089 B2* | 5/2015 | Rubin | ...................... | G08G 9/02 370/347 |
| 2005/0083212 A1* | 4/2005 | Chew | ...................... | G08G 1/14 340/932.2 |
| 2006/0212344 A1* | 9/2006 | Marcus | .................. | G07B 15/02 705/13 |
| 2006/0250278 A1* | 11/2006 | Tillotson | .................. | G08G 1/14 340/932.2 |
| 2011/0015934 A1* | 1/2011 | Rowe | ...................... | G06Q 30/02 705/1.1 |
| 2013/0335240 A1* | 12/2013 | Meier | ...................... | G08G 1/14 340/932.2 |

(Continued)

*Primary Examiner* — Brian Wilson
*Assistant Examiner* — Adnan Aziz
(74) *Attorney, Agent, or Firm* — Renner, Otto, Boisselle & Sklar, LLP

(57) ABSTRACT

There is provided a parking monitoring system comprising one or more sensors adapted to be deployed within a parking slot; a controller unit adapted to be connected to the one or more sensors for receiving information from the one or more sensors when a vehicle is parked in the parking slot, wherein the received information comprises activation and de-activation signals of the one or more sensors; and wherein the controller unit is adapted to determine whether the vehicle parked within the parking slot is allowed to be parked inside the parking slot based on the received activation and de-activation signals. The system is particularly adapted to monitor whether vehicles of certain categories such as bicycles, vans, cars and trucks are parked within their respective parking zones reserved for these categories of vehicles.

14 Claims, 11 Drawing Sheets

(56) References Cited

U.S. PATENT DOCUMENTS

| | | | | |
|---|---|---|---|---|
| 2014/0232562 A1* | 8/2014 | Gupta | .................... | G08G 1/146 340/932.2 |
| 2014/0372155 A1* | 12/2014 | Wang | .................... | G06Q 10/02 705/5 |
| 2015/0149263 A1* | 5/2015 | Stenneth | ................ | G07B 15/02 705/13 |
| 2015/0179070 A1* | 6/2015 | Sandbrook | ............ | G08G 1/149 340/932.2 |
| 2015/0310744 A1* | 10/2015 | Farrelly | ......... | G06Q 10/063114 340/932.2 |
| 2016/0049077 A1* | 2/2016 | Sandbrook | ............ | G08G 1/146 340/932.2 |

* cited by examiner

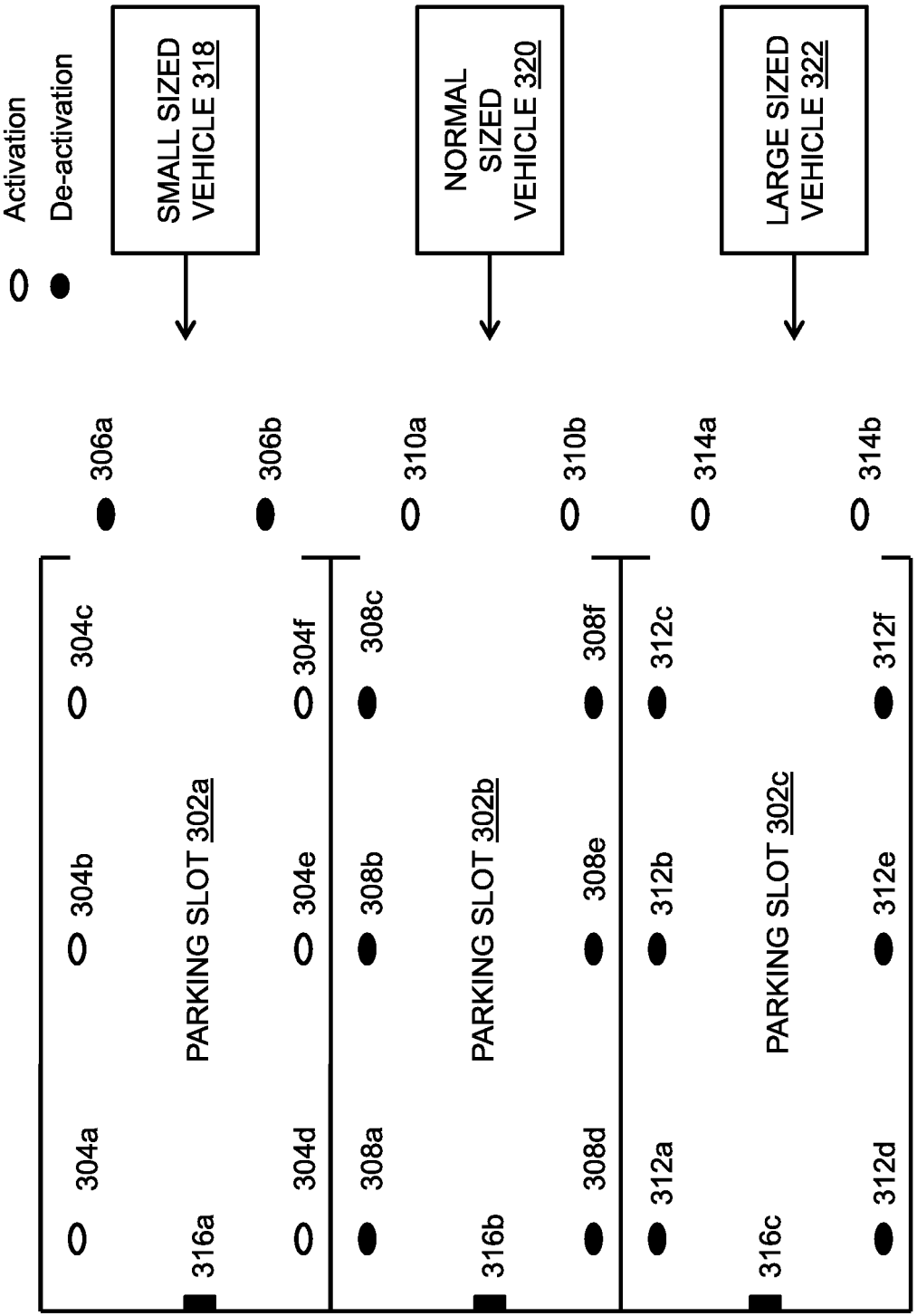

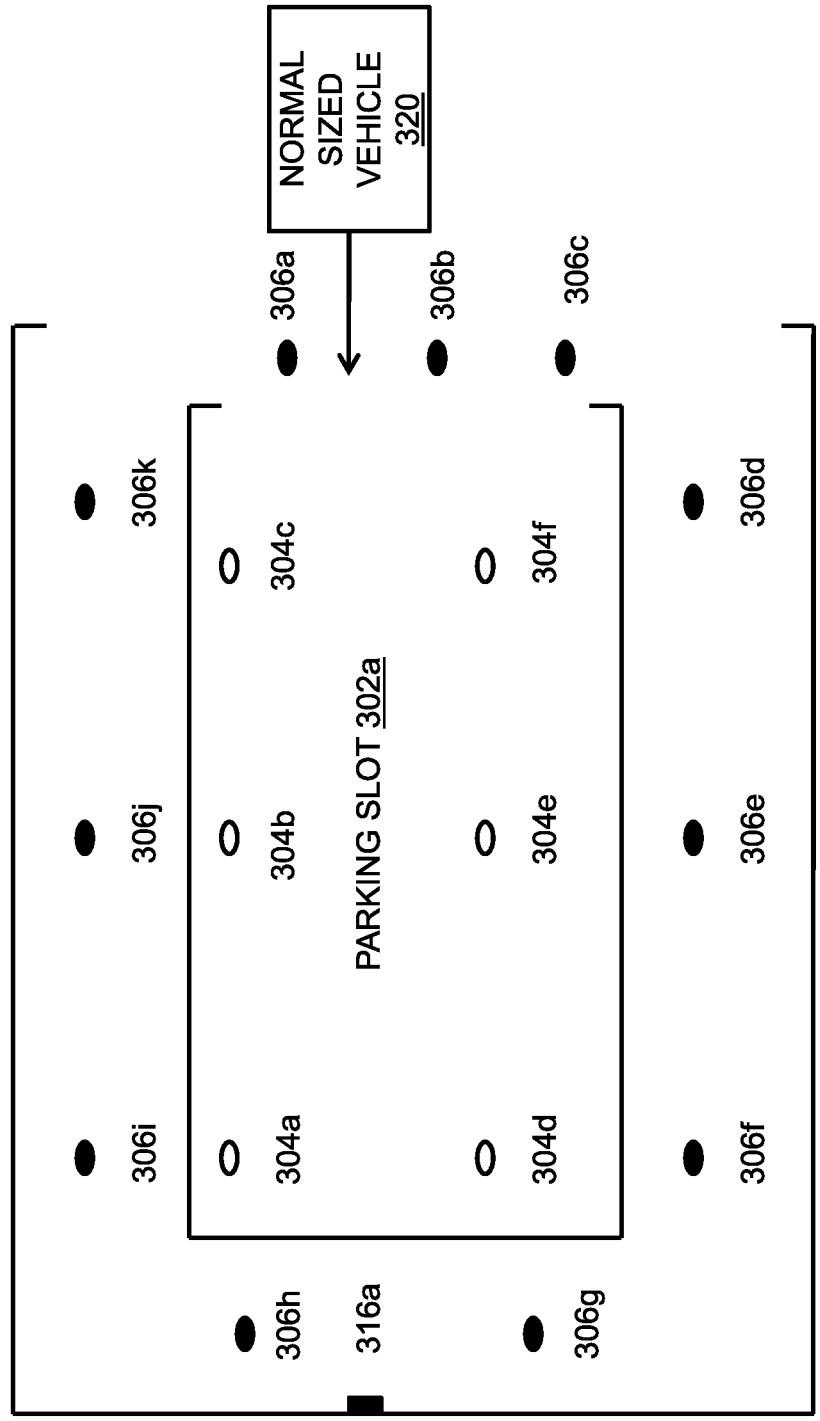

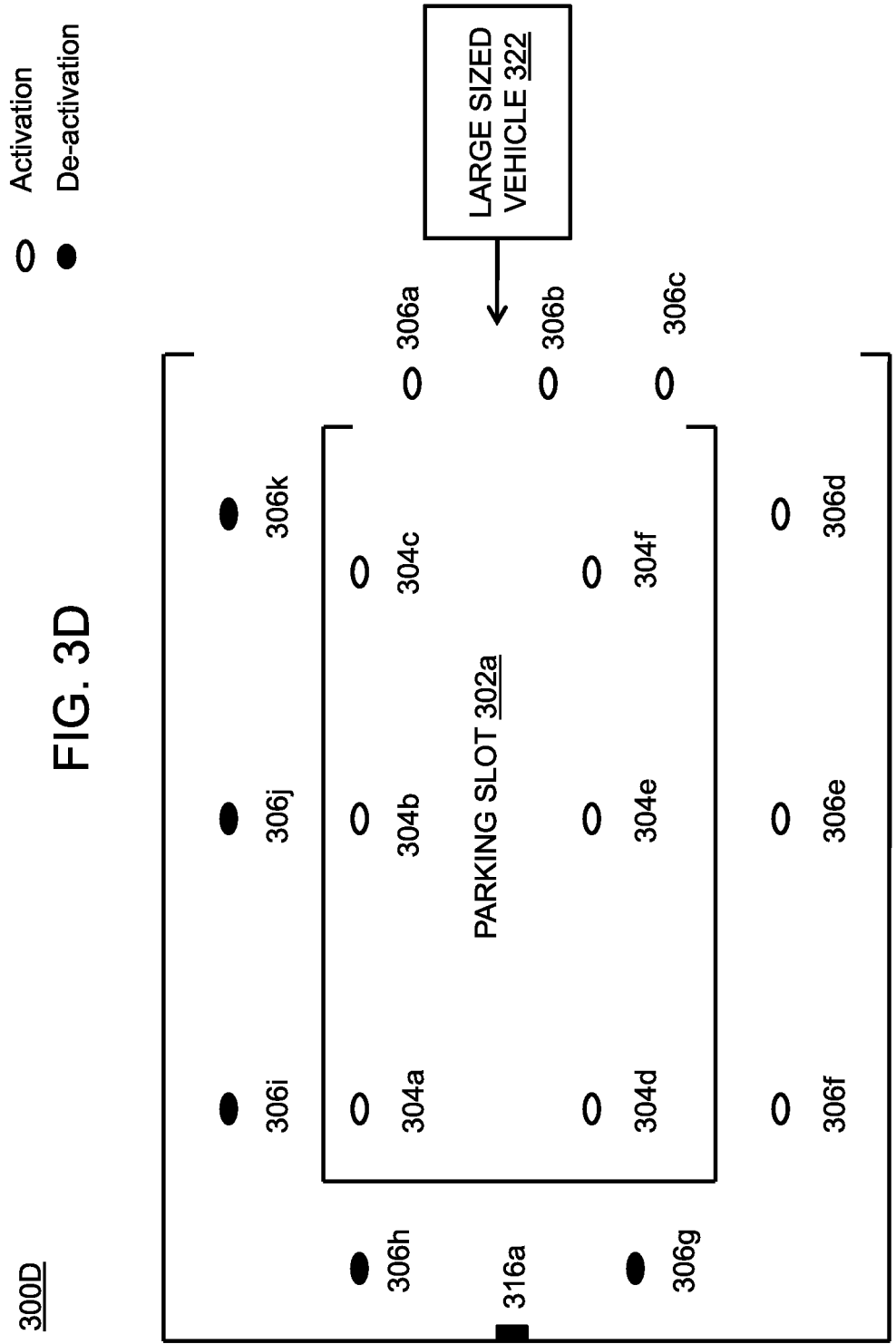

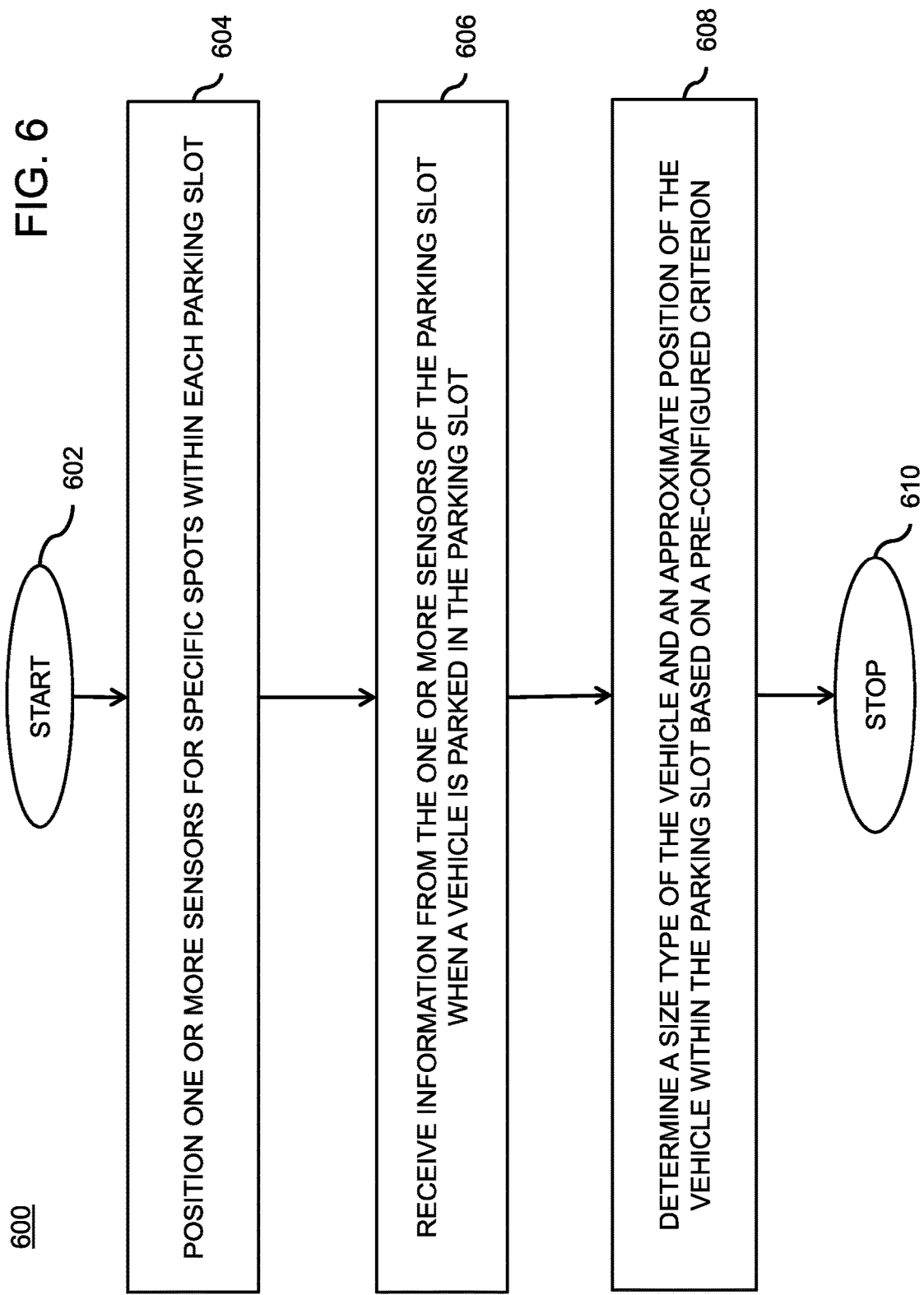

PARKING MONITORING SYSTEM

FIELD OF THE INVENTION

The present invention relates generally to a parking monitoring systems and parking facilities and more particularly to parking monitoring system.

BACKGROUND OF THE INVENTION

During the last several years, the advancements of technology have had a tremendous impact on our lives. There are various real life scenarios where use of electronics and communication devices such as personal computers, sensing networks and devices, hand-held personal organizers and computerized automotive controls have changed one's daily life. However, there are very few instances where these technological advancements are being efficiently used in parking monitoring management.

One can easily find a lot of parking facilities across the city. Most of these parking facilities have ample parking slots to accommodate vehicles. However, most of these facilities are not monitored properly, which leads to a chaotic state of affairs. The chaos leads to violating the rules of parking facility by drivers. For example, more often than not, a driver of a medium size vehicle parks his vehicle in a slot allocated for a large size vehicle which leads to a lesser number of available slots allocated for large size vehicles. In addition, even if the driver parks his car in an appropriate size slot, an improper parking of the vehicle in that slot causes an encroachment on an adjacent parking slot. This inadvertent encroachment further leads to reduced number of parking slots. Moreover, at times, the drivers are not aware that they have parked their vehicle at inappropriate slot or encroached on an adjacent parking slot or have violated the parking rules of that facility.

Most of the existing facilities deploy a person/team to visually inspect all of the parking slots periodically, regardless of whether vehicles are actually there. This type of monitoring of parking is costly and time consuming. In addition, this task becomes more difficult when the parking facilities are distributed over a large area, such as a city block or a large, multi-level parking garage.

The prior art provides some existing parking monitoring systems which utilizes technology in monitoring of the parking slots. However, most of these systems are limited to the detection of the presence or absence of a vehicle in a particular parking slot. Such systems are employed, for example, in garages to provide occupancy statistics, and to direct vehicles to open spaces. These systems do not apply parking restriction rules to determine whether a particular vehicle is parked in a slot where it should not be or is parked properly in the slot.

SUMMARY OF THE INVENTION

The present invention aims to overcome the above mentioned limitations and other problems associated with the prior art. In light of the above stated discussion, there is a need for a method and system which overcomes the above stated disadvantages.

As a first aspect of the invention, there is provided a parking monitoring system comprising:
one or more sensors adapted to be deployed within a parking slot;
a controller unit adapted to be connected to the one or more sensors for receiving information from the one or more sensors when a vehicle is parked in the parking slot, wherein the received information comprises activation and de-activation signals of the one or more sensors; and
wherein the controller unit is adapted to determine whether the vehicle parked within the parking slot is allowed to be parked inside the parking slot based on the received activation and de-activation signals.

In an embodiment of the invention:
the parking slot has a parking slot size and is restricted for vehicles having a permissible size type;
the one or more sensors are adapted to be deployed within the parking slot according to a deployment configuration defining each sensor or group of sensors among the one or more sensors to a specific location or zone within the parking slot, the deployment configuration being based on the size of the parking slot and the permissible vehicles size type; and
the controller unit is adapted to determine a size type of a vehicle parked within the parking slot based on the deployment configuration and on the activation and de-activation signals received from the one or more sensors, and to generate a breach notification when the vehicle size type determined is different from the permissible vehicles size type.

In an embodiment of the invention, the controller unit is further adapted to determine, based on the activation and de-activation signals received, the approximate position of the vehicle and whether the approximate position determined is a compliant position, and to generate a breach notification when the approximate position determined is not a compliant position.

In an embodiment of the invention, the one or more sensors of the parking slot are a plurality of sensors comprising a first set of sensors and a second set of sensors, the first set of sensors being adapted to be deployed within an inner boundary portion of the parking slot and the second set of sensors being adapted to be deployed within an outer boundary portion of the parking slot, the inner boundary portion having a size defined based on the vehicles permissible size type.

In an embodiment of the invention, the activation of all the sensors of the first set of sensors and the deactivation of all the sensors of the second set of sensors is indicative of presence of a parked vehicle of a permissible size type parked in a compliant position.

In an embodiment of the invention, the activation of one or more sensors of the second set of sensors is indicative of a breach.

In an embodiment of the invention, the activation of only a part of the sensors of the second set of sensors is indicative of a breach.

In an embodiment of the invention, the system further comprises an image capturing unit adapted to capture an image of a license plate number of the parked vehicle.

In an embodiment of the invention, the simage capturing unit is adapted to transmit the breach notification to a remote administration unit adapted to issue a fine.

In an embodiment of the invention, the parking slot is a restricted area where parking is not permitted or restricted for specific types of people or vehicles.

As a further aspect of the invention, there is provided a parking facility deploying the parking monitoring system of any one of the embodiments presented in this application.

According to various embodiments, the present invention provides a parking monitoring system for determining a size type of a vehicle of a plurality of vehicles parked in a parking slot of a plurality of parking slots of a parking facility. The parking monitoring system includes one or more sensors positioned in the each parking slot and a controller unit. The one or more sensors are positioned and pre-configured for specific slots within the each parking slot based on a size of the parking slot and the size type of the vehicle allowed to be parked in the parking slot. The controller unit is configured to receive information from the one or more sensors of the parking slot when the vehicle is parked in the parking slot, and determine the size type of the vehicle and an approximate position of the vehicle within the parking slot based on a pre-configured criterion. The received information is related to activation and de-activation of the one or more sensors in the parking slot. The pre-configured criterion is based on the received information from the one or more sensors when the vehicle is parked in the parking slot.

In an embodiment of the present invention, the controller unit is further configured to generate a breach notification when the size type of the vehicle allowed in the parking slot is different from the size type of the vehicle being parked in the parking slot. The parking monitoring system further includes an image capturing unit to capture an image of a license plate number of the parked vehicle. The image is captured for the vehicle to transmit the breach notification to at least one of an associated person or a device associated with the vehicle.

In another embodiment of the present invention, the controller unit is further configured to generate a breach notification when the approximate position of the parked vehicle deviates from an allowed position. The parking monitoring system further includes an image capturing unit configured to capture an image of a license plate number of the parked vehicle. The image is captured for the vehicle to transmit the breach notification to at least one of an associated person or a device associated with the vehicle.

In an embodiment of the present invention, the pre-configured criterion is based on mapping of a stored activation and a stored de-activation signals of the one or more sensors in the parking slot for the each size type of the plurality of vehicles for the each size of the plurality of parking slots with the received activation and de-activation signals of the one or more sensors when the vehicle is parked.

In an embodiment of the present invention, the size type of the vehicle is a category of the size of the vehicle. Each parking slot is assigned with the size type of the vehicle which is allowed to be parked.

In an embodiment of the present invention, the one or more sensors of the each parking slot include a first set of one or more sensors, and a second set of one or more sensors. The first set of one or more sensors are arranged within the parking slot and the second set of sensors is arranged on an outer boundary of the parking slot. The controller unit receives information related to corresponding activation and de-activation of the first set of one or more sensors and the second set of one or more sensors.

In yet another aspect, a method for determining a size type of a vehicle parked in a parking slot having an inner boundary portion and an outer boundary portion. The method comprises a first group of sensors within the inner boundary portion and a second group of sensors within the outer boundary portion, receiving information from the sensors when the vehicle is parked in the parking slot, and determining the size type of the vehicle and an approximate position of the vehicle within the parking slot based on a pre-configured criterion. Preferably, the deployment is based on a size of the parking slot and the size type of the vehicle allowed to be parked in the parking slot. The received information is related to activation and de-activation of the sensors in the parking slot. The pre-configured criterion comprises the deployment configuration of the first and second group of sensors within the parking slot.

BRIEF DESCRIPTION OF THE DRAWINGS

The advantages and features of the present invention will become better understood with reference to the following detailed description and claims taken in conjunction with the accompanying drawing, in which:

FIG. 3A, FIG. 3B, FIG. 3C, FIG. 3D, FIG. 3E and FIG. 3F illustrates a system for showing an example of the plurality of parking slots, in accordance with various embodiments of the present invention;

FIG. 6 illustrates a flowchart for determining the size type of the vehicle, in accordance with an embodiment of the present invention.

Like numerals refer to like elements throughout the present invention.

DETAILED DESCRIPTION OF THE INVENTION

The exemplary embodiments described herein for illustrative purposes are subject to many variations in structure and design. It is understood that various omissions and substitutions of equivalents are contemplated as circumstances may suggest or render expedient, but these are intended to cover the application or implementation without departing from the spirit or scope of the present invention.

The terms "a" and "an" herein do not denote a limitation of quantity, but rather denote the presence of at least one of the referenced item.

The terms "having", "comprising", "including", and variations thereof signify the presence of a component which is inclusive or open-ended and does not exclude additional, unrecited elements or method steps.

Figure 1:
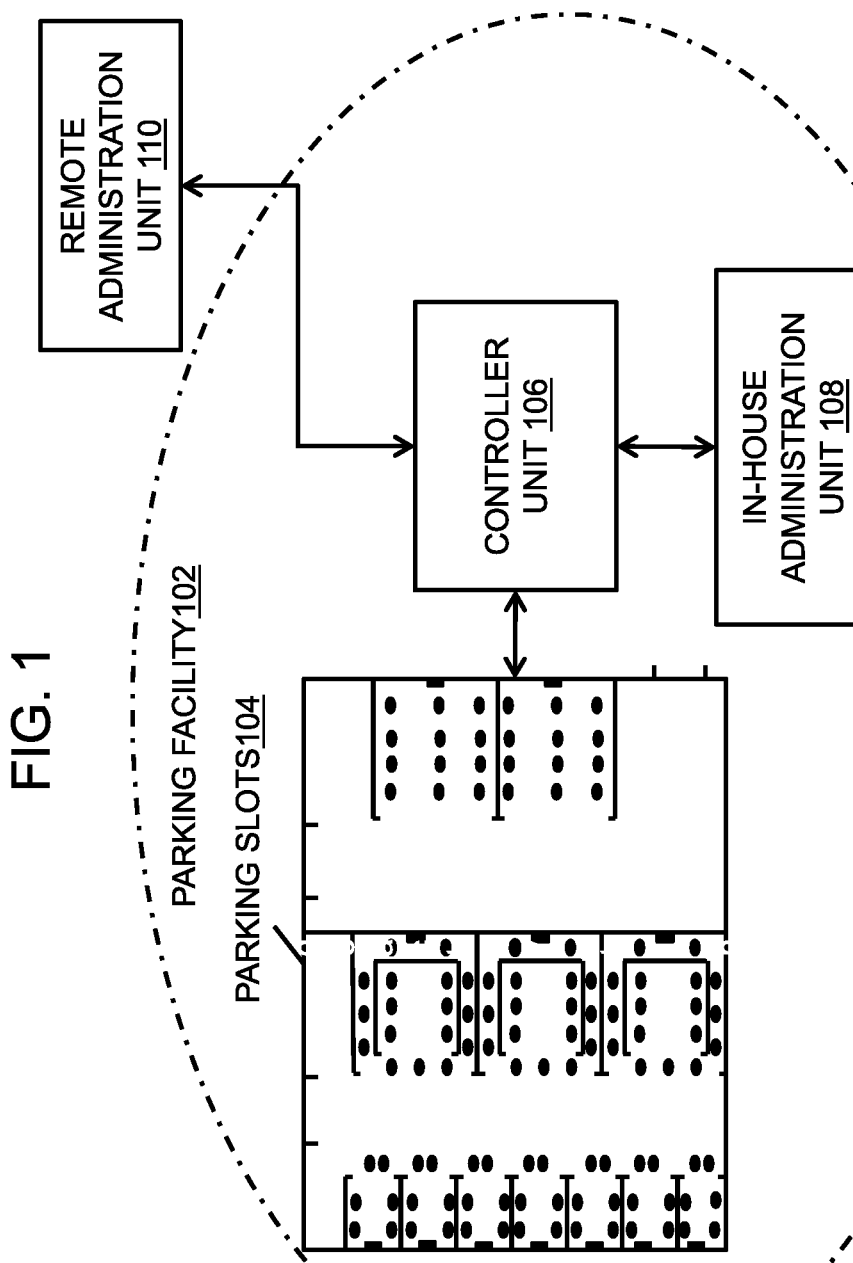
FIG. 1 illustrates a parking monitoring system for determining a size type of a vehicle.

FIG. 1 illustrates a parking monitoring system 100 of a parking facility 102. The parking monitoring system 100 monitors the occupancy of a plurality of parking slots 104 of the parking facility 102 by utilizing a controller unit 106. The parking facility 102 is a facility for providing parking space to the plurality of vehicles. Further, the parking facility 102 can be an off street vehicle parking facility, a multi-level vehicle facility or any other type of vehicle parking facility presently known in the art. The parking facility 102 can be owned by a private company or a government organization. Moreover, the parking facility 102 can be located in a mall, a public area, a hospital or any other place having a facility of letting one or more users to park the vehicles. Further, the parking slots 104 of the parking facility 102 may comprise restricted parking slots which can include reserved and/or priority parking slots for certain categories of peoples or vehicles such as handicapped people, police car vehicles, ambulance vehicles, VIP personals and the like (referred herein as "restricted areas").

Further, each parking slot of the plurality of parking slots 104 are categorized based on the size type of the vehicle which is allowed to be parked inside the parking slot. The size type of the vehicle corresponds to a size of vehicle. For example, a bicycle and a motor bike can be considered as a small size vehicle. Similarly, a car and a van can be referred to as a small size vehicle and a bus and a truck can be considered/categorized/referred to as large size vehicle.

Further, the each parking slot of the parking slots 104 having the same size allows the parking of the vehicle having the same size type. In an embodiment of the present invention, each parking slot of the parking slots 104 having the same size are adjacent to each other in the parking facility 102. In another embodiment of the present invention, the parking slots 104 of variable size are adjacent to each other or designed in a random manner in the parking facility 102.

In addition, the controller unit 106 is configured for determining the size type of the vehicle of the plurality of vehicles parked in the parking slot of the parking slots 104 of the parking facility 102. In general, the controller unit 106 of the parking facility 102 includes a data base and a central interface unit. The controller unit 106 can include any type of data processing and information center, such as a central processing unit in a municipality. The data base preferably includes any information pertinent to monitoring and/or billing use of parking facilities, such as parking facility identity, parking facility availability of a certain region, vehicle identification, user identification, billing information, and time related information of use of a parking facility. The database may also include law enforcement information, such as identity of stolen vehicles or previous parking or traffic violations.

As mentioned above, the controller unit 106 is configured to determine the size type of the vehicle parked in the parking slots 104. Moreover, the controller unit 106 is used for detecting whether the vehicle parked in the parking slot of the parking slots 104 corresponds to the size type of the vehicle which is allowed to be parked. Furthermore, the controller unit 106 is configured to detect whether the vehicle parked in the parking slot of the parking slots 104 is appropriately positioned within a boundary of the corresponding parking slot.

In addition, an in-house administration unit 108 or a remote administration unit 110 can communicate with a central interface unit of the controller unit 106. The in-house administration unit 108 is configured to take a set of actions against the vehicle which is determined to be parked wrongly in a parking slot. The in-house administration unit 108 may be an interconnection of one or more communication devices associated with the controller unit 106 of the parking monitoring system 100. Similarly, the remote administration unit 110 is configured to take a set of actions against the vehicle which is determined to be parked wrongly inside a parking slot.

The remote administration unit 110 may belong to any private or government organization authorized for the operating and the administrating the parking monitoring system 100 installed inside the parking facility 102.

It may be noted that in FIG. 1, the parking monitoring system 100 is shown to be associated with the parking facility 102; however, those skilled in the art would appreciate that the parking monitoring system 100 is associated with more number of parking facilities. It may also be noted that in FIG. 1, the controller unit 106 is shown to be associated with the in-house administration unit 108; however, those skilled in the art would appreciate that the controller unit 106 is associated with one or more in-house administration units and with more number of the third party administration units.

Figure 2:
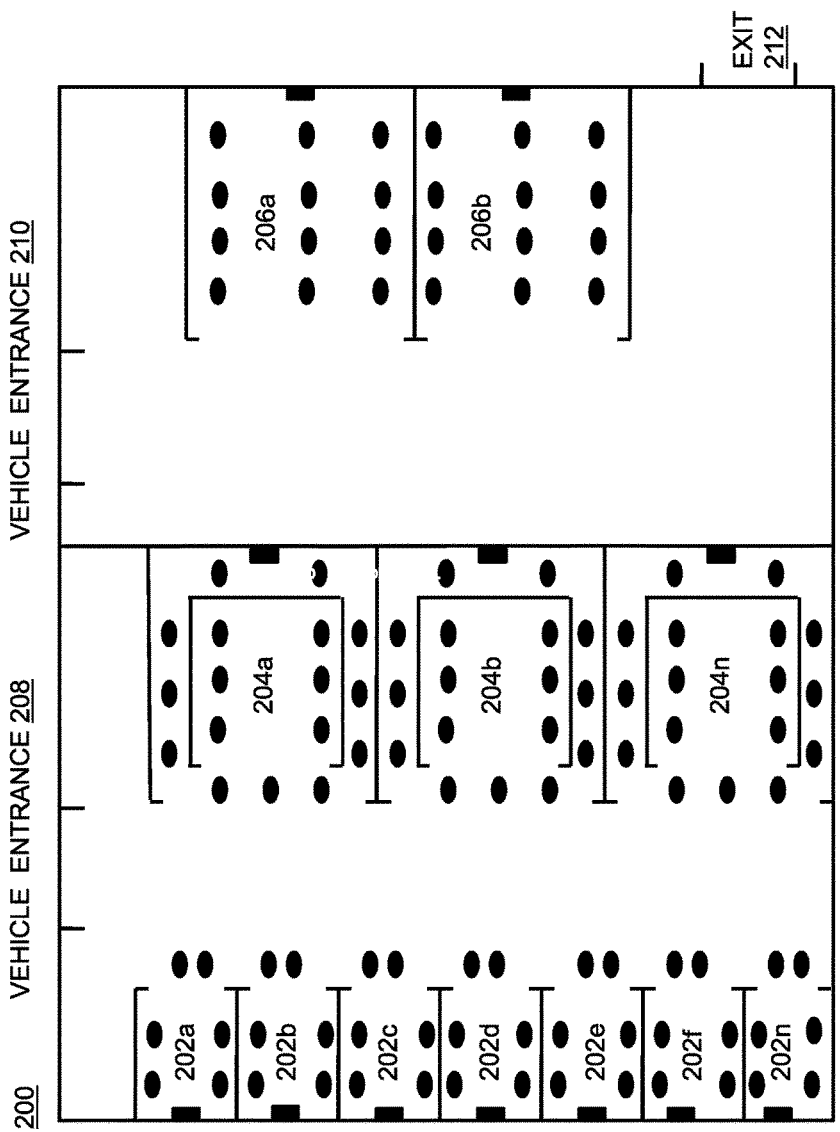
FIG. 2 illustrates a layout of parking slots for each size type of the vehicle.

FIG. 2 illustrates a sample layout of a parking slot 200, in accordance with an embodiment of the present invention. It may be noted that to explain the system elements of FIG. 2, references will be made to the system elements of the FIG. 1. The sample layout of parking slot 200 includes a first plurality of parking slots 202a-n in which a first size type of vehicles are allowed to be parked, a second plurality of parking slots 204a-n in which a second size type of vehicles are allowed to be parked, a third plurality of parking slots 206a-b in which a third size type of vehicles are allowed to be parked, vehicle entrance gates 208-210 and an exit gate 212. In the sample lay out, the vehicle entrances 208-210 are configured to allow the vehicles to enter the parking facility 102. In addition, the exit 212 is configured to allow the vehicles to leave the parking facility 102.

In an embodiment, multiple sensors are positioned in each of the first plurality of parking slots 202a-n, the second plurality of parking slots 204a-n and the third plurality of parking slots 206a-b in different configurations (explained in description for FIG. 3). For example, each of a parking slot 202a, a parking slot 202b, a parking slot 202c, a parking slot 202d, a parking slot 202e, a parking slot 202f and a parking slot 202n include the sensors positioned in a first pre-determined configuration. Moreover, the first plurality of parking slots 202a-n is enabled for allowing the parking of the first size type of vehicles. In an embodiment, the first size type of vehicles includes the motorcycle, the bicycle or any other type of vehicle that is small in size. On the same lines, each of a parking slot 204a, a parking slot 204b and a parking slot 204n include the sensors positioned in a second pre-determined configuration. Moreover, the second plurality of parking slots 204a-n is enabled for allowing the parking of the second size type of vehicles. For example, the second size type of vehicles includes a car, a van or any other type of vehicle that is medium in size. Similarly, each of a parking slot 206a and a parking slot 206b include the sensors positioned in a third pre-determined configuration. Moreover, the third plurality of parking slots 206a-b is enabled for allowing the parking of the third size type of vehicles. For example, the third size type of vehicles includes a truck, a bus or any other type of vehicle that is large in size.

Further, each parking slot of the first plurality of parking slots 202a-n, the second plurality of parking slots 204a-n and the third plurality of parking slots 206a-b includes a parking zone and an outer boundary. In each parking slot, one set of sensors are placed in the parking zone and another set of sensors are placed in the outer boundary. The positioning of sensors is based on a first pre-determined configuration for each of the first plurality of parking slots 202a-n, a second pre-determined configuration for each second plurality of parking slots 204a-n and a third pre-determined configuration for each third plurality of parking slots 206a-b. In an embodiment of the present invention, the first pre-determined configuration, the second configuration and the third configuration of positioning of sensors are different.

In the first pre-determined configuration, the sensors of each of the parking slots 202a-n are placed in specific slots within the parking zone. Similarly, in the second pre-determined configuration, the sensors of each of the parking slots 204a-n are placed in specific slots within the parking zone of the each parking slot. Similarly, in the third pre-determined configuration, the sensors of each of the parking slots 206a-b are placed in specific slots within the parking zone of the each parking slot. The placement/position of sensors for each of the first pre-determined configuration, the second pre-determined configuration and the third pre-determined configuration are based on the respective size of each of the parking slots 202a-n, the parking slots 204a-n and the parking slots 206a-b and the size type of the first size type of vehicles allowed for each of the parking slots 202a-n, the second size type of vehicles allowed for each of the parking slots 204a-n and the third size type of vehicles allowed for each of the parking slots 206a-b. Moreover, these sensors are configured to detect a presence of the vehicle at the specific slots within the parking zone of the each parking slot of the plurality of parking slots 202a-n, the second plurality of parking slots 204a-n and the third plurality of parking slots 206a-b. In an embodiment of the present invention, each of the sensors detects the vehicle by emitting an electromagnetic field or a beam of electromagnetic radiation and analyzing a change in the electromagnetic field or a return back signal.

In an embodiment of the present invention, the presence of the vehicle in each of the first plurality of parking slots 202a-n, the second plurality of parking slots 204a-n and the third plurality of parking slots 206a-b is detected by an activation or de-activation of the corresponding set of sensors. In an embodiment of the present invention, the activation and/or de-activation of the sensors determines the size type of the vehicle parked in the parking slots.

In an embodiment of the present invention, one or more sensors of the parking slot 202a positioned according to the first pre-determined configuration activates when an inappropriate vehicle size enters in the parking zone of the parking slot 202a. In another embodiment of the present invention, one or more sensors of parking slot 202a positioned according to the first pre-determined configuration activates when an appropriate vehicle size is parked in an appropriate manner in the parking slot 202a. The activation of the one or more sensors generates detection signals which create an alert or a breach notification regarding the violation of the rules of the parking facility.

In an embodiment of the present invention, the activation and the de-activation status of the sensors for the first pre-determined configuration, the second pre-determined configuration and the third pre-determined configuration is different for corresponding first plurality of parking slots 202a-n, the corresponding second plurality of parking slots 204a-b and the corresponding third plurality of parking slots 206a-b. This activation and the de-activation status of the sensors determine the size type of the vehicle and the position of the vehicle parked in the parking slot.

It may be noted that in FIG. 2, the sample parking facility is shown to include the first plurality of parking slots 202a-n, the second plurality of parking slots 204a-n and the third plurality of parking slots 206a-b; however, those skilled in the art would appreciate that there are more number of parking slots for each size type of vehicles.

FIG. 3A illustrates an example system 300A showing activation and deactivation status of sensors for parking slots appropriate for the first size type of vehicles, in accordance with an embodiment of the present invention. The system 300A includes a parking slot 302a, a parking slot 302b, a parking slot 302c, a first set of sensors 304, a second set of sensors 306, a third set of sensors 308, a fourth set of sensors 310, a fifth set of sensors 312, a sixth set of sensors 314, a set of image capturing unit 316, a small size vehicle 318, a normal size vehicle 320 and a large size vehicle 322. The set of image capturing unit 316 includes a capturing unit 316a associated with the parking slot 302a, a capturing unit 316b associated with the parking slot 302b and a capturing unit 316c associated with the parking slot 302c. The set of image capturing unit 316 is installed in front of the parking slot 302a, the parking slot 302b and the parking slot 302c. Further, the set of image capturing unit 316 are configured for capturing images of the vehicles wrongly parked or not associated with the size type of the parking slot 302a, the parking slot 302b and the parking slot 302c.

The system 300A depicts the activation and the de-activation status of the first set of sensors 304 and the second set of sensors 306 when the small size vehicle 318 is parked inside the parking slot 302a. The parking slot 302a is defined for allowing the parking of the vehicles belonging to the small size type. Further, the system 300A depicts the activation and the de-activation status of the third set of sensors 308 and the fourth set of sensors 310 when the normal size vehicle 320 is parked inside the parking slot 302b. The parking slot 302b is defined for allowing the parking of the vehicles belonging to the small size type. In addition, the system 300A depicts the activation and the de-activation status of the fifth set of sensors 312 and the sixth set of sensors 314 when the large size vehicle 322 is parked inside the parking slot 302c. The parking slot 302c is defined for allowing the parking of the vehicles belonging to the small size type.

Going further, the first set of sensors 304 are positioned inside the parking zone of the parking slot 302a defined for the vehicles of the small size type. The first set of sensors 304 includes a sensor 304a, a sensor 304b, a sensor 304c, a sensor 304d, a sensor 304e and a sensor 304f. Moreover, the second set of sensors 306 is positioned on the outer boundary of the parking slot 302a. The second set of sensors 306 includes a sensor 306a and a sensor 306b. The small size vehicle 318 enters the parking slot 302a and a user driving the small size vehicle 318 parks the small size vehicle 318 in the pre-defined parking space made for the small size vehicle 318. The small size vehicle 318 includes the motorcycle, the bicycle and the like. The sensor 304a, the sensor 304b, the sensor 304c, the sensor 304d, the sensor 304e and the sensor 304f activates on detecting the presence of the small size vehicle 318 inside the parking slot 302a. Moreover, the sensor 306a and the sensor 306b remains deactivated due to an absence of the small size vehicle 318 over the outer boundary space equipped with the second set of sensors 306.

The activation of the sensor 304a, the sensor 304b, the sensor 304c, the sensor 304d, the sensor 304e and the sensor 304f and the de-activation of the sensor 306a and the sensor 306b determine the small size vehicle 318 to be in a category of the first size type of vehicle. The capturing unit 316a does not receive a trigger and does not take an image of the small size vehicle 318. The sensor 304a, the sensor 304b, the sensor 304c, the sensor 304d, the sensor 304e and the sensor 304f generate the activation information and the sensor 306a and the sensor 306b generate the de-activation information.

In an embodiment of the present invention, one or more of the second set of sensors 306 are activated when the small size vehicle 318 is parked inside the parking slot 302a defined for allowing the parking of the vehicles belonging to the small size type. The activation of the second set of sensors 306 indicates a deviation of an approximate position of the small size vehicle 320 from an allowed position.

In addition, the third set of sensors 308 are positioned inside the parking zone of the parking slot 302b defined for the vehicles of the small size type. The third set of sensors 308 includes a sensor 308a, a sensor 308b, a sensor 308c, a sensor 308d, a sensor 308e and a sensor 308f. Moreover, the fourth set of sensors 308 is positioned on the outer boundary of the parking slot 302b. The fourth set of sensors 310 includes a sensor 310a and a sensor 310b. The normal size vehicle 320 enters the parking slot 302b and the user driving the normal size vehicle 320 tries to park the normal size vehicle 320 in the pre-defined parking space made for the small size vehicle 318. The size of the parking slot 302b does not enable the parking of the normal size vehicle 320. The sensor 308a, the sensor 308b, the sensor 308c, the sensor 308d, the sensor 308e and the sensor 308f deactivates due to the absence of the normal size vehicle 320. Moreover, the sensor 310a and the sensor 310b activates on detecting the presence of the normal size vehicle 320 over the outer boundary space equipped with the fourth set of sensors 308.

The de-activation of the sensor 308a, the sensor 308b, the sensor 308c, the sensor 308d, the sensor 308e and the sensor 308f and the activation of the sensor 310a and the sensor 310b determine the normal size vehicle 320 to not be in the category of the first size type of vehicle. The capturing unit 316b receives a trigger and takes the image of the normal size vehicle 320. The sensor 308a, the sensor 308b, the sensor 308c, the sensor 308d, the sensor 308e and the sensor 308f generates the de-activation information and the sensor 310a and the sensor 310b generate the activation information.

Furthermore, the fifth set of sensors 312 are positioned inside the parking zone of the parking slot 302c defined for the vehicles of the small size type. The fifth set of sensors 312 includes a sensor 312a, a sensor 312b, a sensor 312c, a sensor 312d, a sensor 312e and a sensor 312f. Moreover, the sixth set of sensors 314 is positioned on the outer boundary of the parking slot 302c. The sixth set of sensors 314 includes a sensor 314a and a sensor 314b. The large size vehicle 322 enters the parking slot 302c and the user driving the large size vehicle 320 tries to park the large size vehicle 322 in the pre-defined parking space made for the small size vehicle 318. The size of the parking slot 302c does not enable the parking of the large size vehicle 322. The sensor 312a, the sensor 312b, the sensor 312c, the sensor 312d, the sensor 312e and the sensor 312f deactivates due to the absence of the large size vehicle 322 inside the parking slot 302c. Moreover, the sensor 314a and the sensor 314b activates on detecting the presence of the large size vehicle 322 over the outer boundary space equipped with the sixth set of sensors 314.

The de-activation of the sensor 312a, the sensor 312b, the sensor 312c, the sensor 312d, the sensor 312e and the sensor 312f and the activation of the sensor 314a and the sensor 314b determine the large size vehicle 322 to not be in the category of the first size type of vehicle. The capturing unit 316c receives a trigger and takes the image of the large size vehicle 322. The sensor 312a, the sensor 312b, the sensor 312c, the sensor 312d, the sensor 312e and the sensor 312f generate the de-activation information and the sensor 314a and the sensor 314b generate the activation information.

FIG. 3B illustrates an example system 300B showing activation and deactivation status of sensors for parking slots appropriate for parking slots for the second size type of vehicles, in accordance with another embodiment of the present invention. It may be noted that to explain the system elements of FIG. 3B, references will be made to the system elements of the FIG. 1, FIG. 2 and FIG. 3A. The system 300B includes the parking slot 302a, the first set of sensors 304, the second set of sensors 306, the capturing unit 316a and the normal size vehicle 320.

The system 300B depicts the activation and the de-activation status of the first set of sensors 304 and the second set of sensors 306 when the normal size vehicle 320 is parked inside the parking slot 302a defined for allowing the parking of the vehicles belonging to the normal size type. Going further, the first set of sensors 304 are positioned inside the parking zone of the parking slot 302a defined for the vehicles of the normal size type. The first set of sensors 304 includes the sensor 304a, the sensor 304b, the sensor 304c, the sensor 304d, the sensor 304e and the sensor 304f. Moreover, the second set of sensors 306 is positioned on the outer boundary of the parking slot 302a. The second set of sensors 306 includes the sensor 306a, the sensor 306b, a sensor 306c, a sensor 306d, a sensor 306e, a sensor 306f, a sensor 306g, a sensor 306h, a sensor 306i, a sensor 306j and a sensor 306k.

The normal size vehicle 320 enters the parking slot 302a and the user driving the normal size vehicle 320 parks the normal size vehicle 320 in the pre-defined parking space made for the normal size vehicle 320. The normal size vehicle 320 includes the car, the mini-truck, the van and the like. The sensor 304a, the sensor 304b, the sensor 304c, the sensor 304d, the sensor 304e and the sensor 304f are activated on detecting the presence of the normal size vehicle 320 inside the parking slot 302a. Moreover, the sensor 306a, the sensor 306b, the sensor 306c, the sensor 306d, the sensor 306e, the sensor 306f, the sensor 306g, the sensor 306h, the sensor 306i, the sensor 306j and the sensor 306k remain deactivated due to the absence of the normal size vehicle 320 over the outer boundary space equipped with the second set of sensors 306. The outer boundary space corresponds to the outer perimeter of the parking slot 302a.

The activation of the sensor 304a, the sensor 304b, the sensor 304c, the sensor 304d, the sensor 304e and the sensor 304f and the de-activation of the sensor 306a, the sensor 306b, the sensor 306c, the sensor 306d, the sensor 306e, the sensor 306f, the sensor 306g, the sensor 306h, the sensor 306i, the sensor 306j and the sensor 306k determine the normal size vehicle 320 to be in a category of the size type of vehicle. The capturing unit 316a is not triggered and does not take an image of the normal size vehicle 320. The sensor 304a, the sensor 304b, the sensor 304c, the sensor 304d, the sensor 304e and the sensor 304f generate the activation information and the sensor 306a, the sensor 306b, the sensor 306c, the sensor 306d, the sensor 306e, the sensor 306f, the sensor 306g, the sensor 306h, the sensor 306i, the sensor 306j and the sensor 306k generate the de-activation information.

In an embodiment of the present invention, the first set of sensors 304 and the one or more of the second set of sensors 306 activates when the normal size vehicle 320 is parked inside the parking slot 302a defined for allowing the parking of the vehicles belonging to the normal size type. The activation of the second set of sensors 306 indicates a deviation of the approximate position of the normal size vehicle 320 from an allowed position.

Figure 3C:
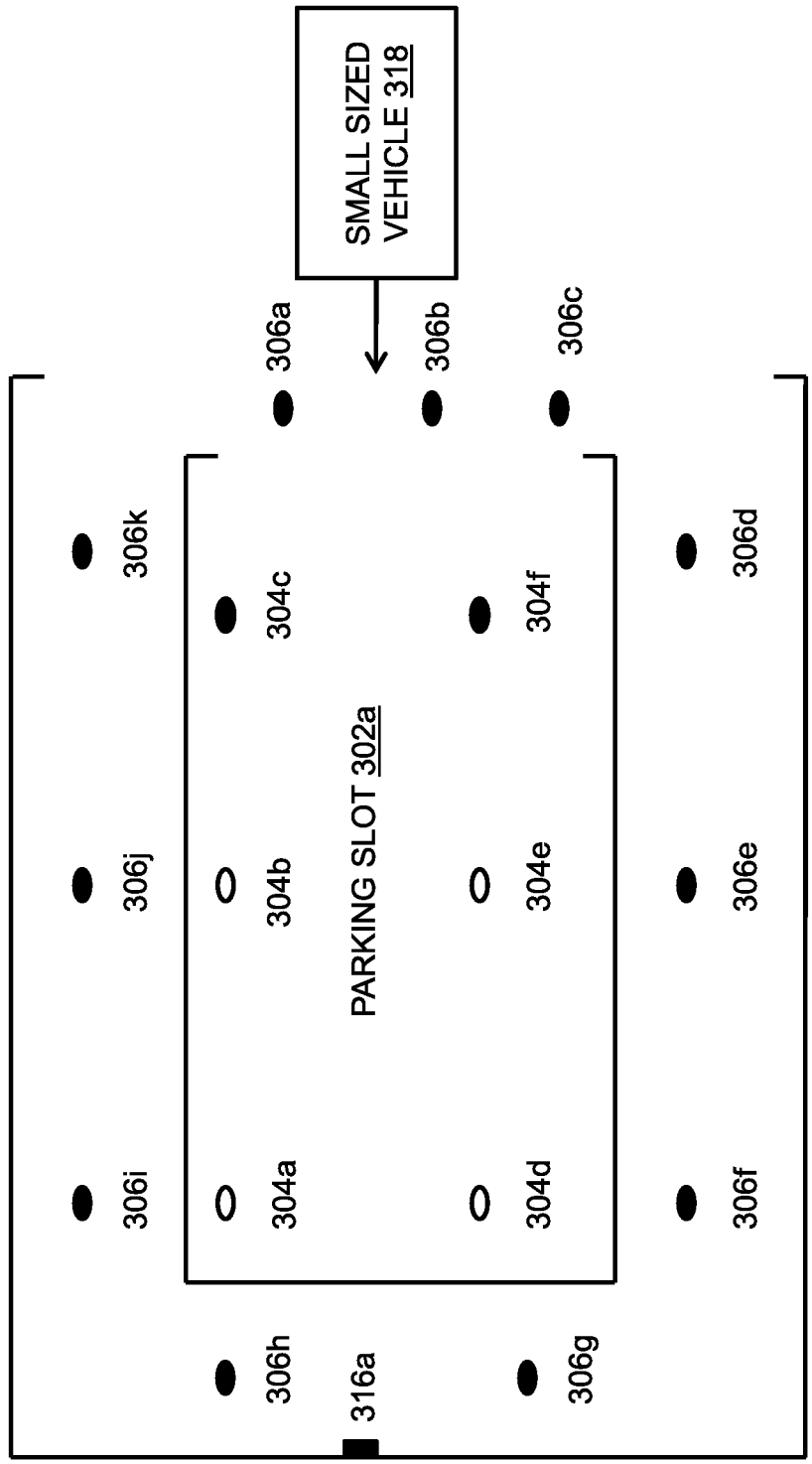

FIG. 3C illustrates an example system 300C showing activation and deactivation status of sensors for parking slots appropriate for the second size type of vehicles, in accordance with yet another embodiment of the present invention.

The system 300C depicts the activation and the de-activation status of the first set of sensors 304 and the second set of sensors 306 when the small size vehicle 318 is parked inside the parking slot 302a defined for allowing the parking of the vehicles belonging to the normal size type. Going further, the first set of sensors 304 are positioned inside the parking zone of the parking slot 302a defined for the vehicles of the normal size type (as exemplary stated above in the detailed description of FIG. 3B).

The small size vehicle 318 enters the parking slot 302a and the user driving the small size vehicle 318 parks the small size vehicle 318 in the pre-defined parking space made for the normal size vehicle 320. The sensor 304a, the sensor 304b, the sensor 304d, and the sensor 304e activates on detecting the presence of the small size vehicle 318 inside the parking slot 302a. Moreover, the sensor 304c, the sensor 304f, the sensor 306a, the sensor 306b, the sensor 306c, the sensor 306d, the sensor 306e, the sensor 306f, the sensor 306g, the sensor 306h, the sensor 306i, the sensor 306j and the sensor 306k remain deactivated due to the absence of the small size vehicle 318 over the outer boundary space equipped with the second set of sensors 306 and due to its absence from the parking zone having the sensor 304c and the sensor 304f of the parking slot 302a. The outer boundary space corresponds to the outer perimeter of the parking slot 302a.

The activation of the sensor 304a, the sensor 304b, the sensor 304d and the sensor 304e and the de-activation of the sensor 304c, the sensor 304f, the sensor 306a, the sensor 306b, the sensor 306c, the sensor 306d, the sensor 306e, the sensor 306f, the sensor 306g, the sensor 306h, the sensor 306i, the sensor 306j and the sensor 306k determine the small size vehicle 318 to be in a category of the normal size type of vehicle. The capturing unit 316a is triggered and takes the image of the small size vehicle 318. The sensor 304a, the sensor 304b, the sensor 304d, and the sensor 304e generate the activation information and the sensor 304c, the sensor 304f, the sensor 306a, the sensor 306b, the sensor 306c, the sensor 306d, the sensor 306e, the sensor 306f, the sensor 306g, the sensor 306h, the sensor 306i, the sensor 306j and the sensor 306k generate the de-activation information.

FIG. 3D illustrates the system 300D for showing an example of the parking slot of the plurality of parking slots for the second size type of vehicles, in accordance with another embodiment of the present invention.

The system 300D depicts the activation and the de-activation status of the first set of sensors 304 and the second set of sensors 306 when the large size vehicle 322 is parked inside the parking slot 302a defined for allowing the parking of the vehicles belonging to the normal size type. Going further, the first set of sensors 304 are positioned inside the parking zone of the parking slot 302a defined for the vehicles of the normal size type (as exemplary stated above in the detailed description of FIG. 3B).

The large size vehicle 322 enters the parking slot 302a and the user driving the large size vehicle 322 parks the large size vehicle 322 in the pre-defined parking space made for the normal size vehicle 320. The sensor 304a, the sensor 304b, the sensor 304c, the sensor 304d, the sensor 304e and the sensor 304f are activated on detecting the presence of the large size vehicle 322 inside the parking slot 302a. Further, the sensor 306a, the sensor 306b, the sensor 306c, the sensor 306d, the sensor 306e and the sensor 306f are activated due to the large size of the large size vehicle 322. The large size vehicle 322 results in the parking of the large size vehicle 322 beyond the parking zone of the parking slot 302a. Moreover, the sensor 306g, the sensor 306h, the sensor 306i, the sensor 306j and the sensor 306k remain deactivated due to the absence of the large size vehicle 322 over some part of the outer boundary space equipped with the second set of sensors 306. The outer boundary space corresponds to the outer perimeter of the parking slot 302a.

The activation of the sensor 304a, the sensor 304b, the sensor 304c, the sensor 304d, the sensor 304e, the sensor 304f, the sensor 306a, the sensor 306b, the sensor 306c, the sensor 306d, the sensor 306e and the sensor 306f and the de-activation of the sensor 306g, the sensor 306h, the sensor 306i, the sensor 306j and the sensor 306k determine the large size vehicle 322 to be in a category of the size type of vehicle. The capturing unit 316a is triggered and takes an image of the large size vehicle 322. The sensor 304a, the sensor 304b, the sensor 304c, the sensor 304d, the sensor 304e, the sensor 304f, the sensor 306a, the sensor 306b, the sensor 306c, the sensor 306d, the sensor 306e and the sensor 306f generate the activation information and the sensor 306g, the sensor 306h, the sensor 306i, the sensor 306j and the sensor 306k generate the de-activation information.

Figure 3E:
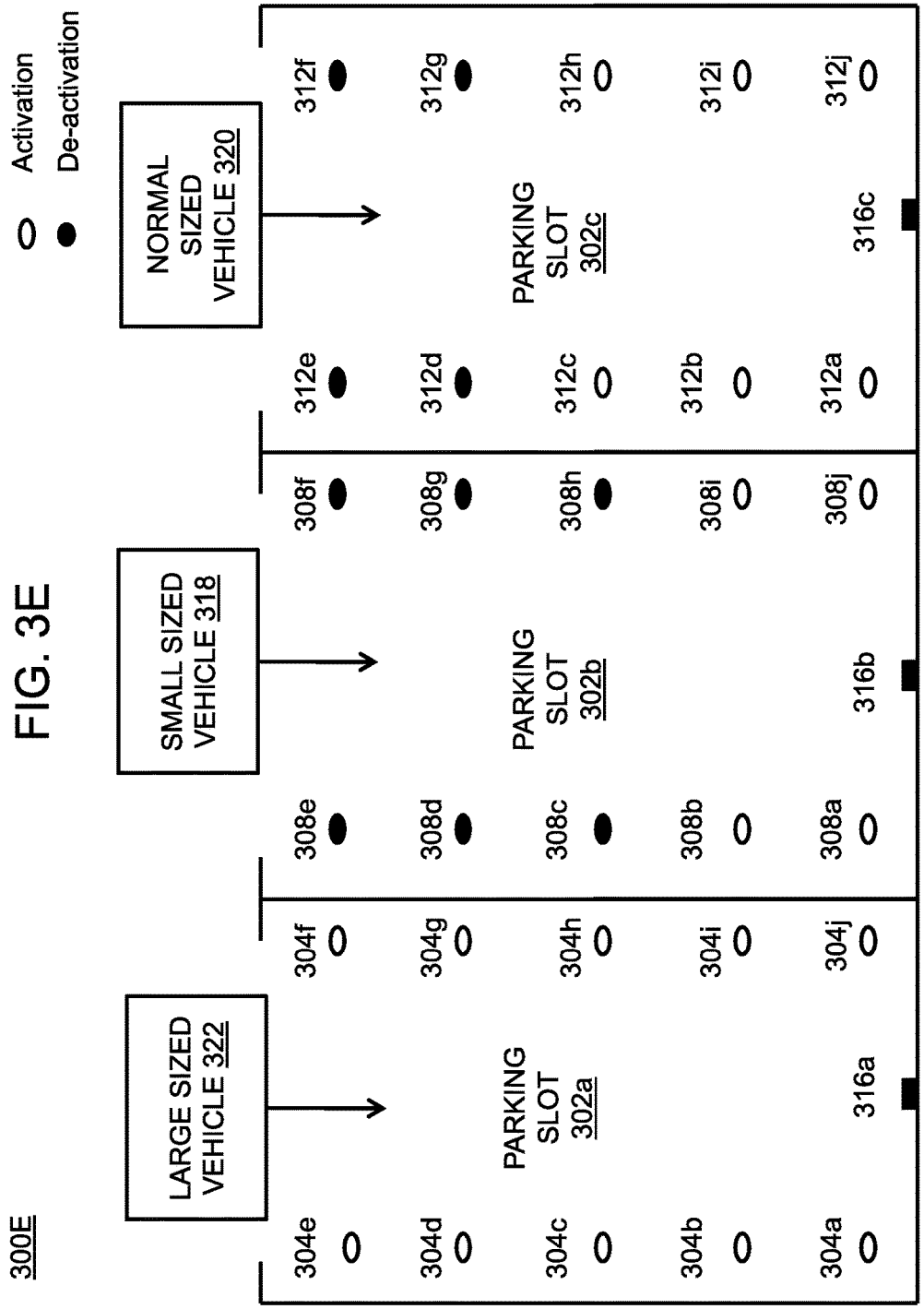

FIG. 3E illustrates a system 300E for showing an example of the plurality of parking slots for the third size type of vehicles, in accordance with yet another embodiment of the present invention. The system 300 includes the parking slot 302a, the parking slot 302b, the parking slot 302c, the first set of sensors 304, the third set of sensors 308, the fifth set of sensors 312, the set of image capturing unit 316, the small size vehicle 318, the normal size vehicle 320 and the large size vehicle 322. The set of image capturing unit 316 includes the capturing unit 316a associated with the parking slot 302a, the capturing unit 316b associated with the parking slot 302b and the capturing unit 316c associated with the parking slot 302c. Further, the set of image capturing unit 316 are configured for capturing images of the vehicles wrongly parked or not associated with the size type of the parking slot 302a, the parking slot 302b and the parking slot 302c.

The system 300E depicts the activation and the de-activation status of the first set of sensors 304 when the large size vehicle 322 is parked inside the parking slot 302a defined for allowing the parking of the vehicles belonging to the large size type. Further, the system 300 depicts the activation and the de-activation status of the third set of sensors 308 when the small size vehicle 318 is parked inside the parking slot 302b defined for allowing the parking of the vehicles belonging to the large size type. In addition, the system 300 depicts the activation and the de-activation status of the fifth set of sensors 312 when the normal size vehicle 322 is parked inside the parking slot 302c defined for allowing the parking of the vehicles belonging to the large size type.

Going further, the first set of sensors 304 are positioned inside the parking zone of the parking slot 302a defined for the vehicles of the large size type. The first set of sensors 304 includes the sensor 304a, the sensor 304b, the sensor 304c, the sensor 304d, the sensor 304e, the sensor 304f, a sensor 304g, a sensor 304h, a sensor 304i and a sensor 304j. The large size vehicle 322 enters the parking slot 302a and the user driving the large size vehicle 322 parks the large size vehicle 322 in the pre-defined parking space made for the large size vehicle 322. The sensor 304a, the sensor 304b, the sensor 304c, the sensor 304d, the sensor 304e, the sensor 304f, the sensor 304g, the sensor 304h, the sensor 304i and a sensor 304j are activated on detecting the presence of the large size vehicle 322 inside the parking slot 302a.

The activation of the sensor 304a, the sensor 304b, the sensor 304c, the sensor 304d, the sensor 304e, the sensor 304f, the sensor 304g, the sensor 304h, the sensor 304i and the sensor 304j determines the large size vehicle 322 to be in a category of the third size type of vehicle. The capturing unit 316a is not triggered and does not take an image of the large size vehicle 322. The sensor 304a, the sensor 304b, the sensor 304c, the sensor 304d, the sensor 304e, the sensor 304f, the sensor 304g, the sensor 304h, the sensor 304i and the sensor 304j generate the activation information.

In addition, the third set of sensors 308 are positioned inside the parking zone of the parking slot 302b defined for the vehicles of the large size type. The third set of sensors 308 includes the sensor 308a, the sensor 308b, the sensor 308c, the sensor 308d, the sensor 308e, a sensor 308f, a sensor 308g, a sensor 308h, a sensor 308i and a sensor 308j. The small size vehicle 318 enters the parking slot 302b and the user driving the small size vehicle 318 parks the small size vehicle 318 in the pre-defined parking space made for the large size vehicle 322. The sensor 308a, the sensor 308b, the sensor 308i and the sensor 308j are activated due to the presence of the small size vehicle 318 on some part of the parking slot 302b covered by the activated third set of sensors 308. Moreover, the sensor 308c, the sensor 308d, the sensor 308e, the sensor 308f, the sensor 308g and the sensor 308h. are deactivated on detecting the absence of the small size vehicle 318 inside a remaining vacant part of the parking slot 302b equipped with the third set of sensors 308.

The activation of the sensor 308a, the sensor 308b, the sensor 308i and the sensor 308j and the de-activation of the sensor 308c, the sensor 308d, the sensor 308e, the sensor 308f, the sensor 308g and the sensor 308h determine the small size vehicle 318 to not be in the category of the third size type of vehicle. The capturing unit 316b is triggered and takes the image of the small size vehicle 318. The sensor 308a, the sensor 308b, the sensor 308i and the sensor 308j generate the activation information and the sensor 308c, the sensor 308d, the sensor 308e, the sensor 308f, the sensor 308g and the sensor 308h generate the de-activation information.

Furthermore, the fifth set of sensors 312 are positioned inside the parking zone of the parking slot 302c defined for the vehicles of the small size type. The fifth set of sensors 312 includes a sensor 312a, a sensor 312b, a sensor 312c, a sensor 312d, a sensor 312e and a sensor 312f. Moreover, the sixth set of sensors 314 is positioned on the outer boundary of the parking slot 302c. The sixth set of sensors 314 includes a sensor 314a and a sensor 314b. The large size vehicle 322 enters the parking slot 302c and the user driving the large size vehicle 322 tries to park the large size vehicle 322 in the pre-defined parking space made for the small size vehicle 318. The size of the parking slot 302c does not enable the parking of the large size vehicle 322. The sensor 312a, the sensor 312b, the sensor 312c, the sensor 312d, the sensor 312e and the sensor 312f are deactivated due to the absence of the large size vehicle 322 inside the parking slot 302c. Moreover, the sensor 314a and the sensor 314b. are activated on detecting the presence of the large size vehicle 322 over the outer boundary space equipped with the sixth set of sensors 314.

The de-activation of the sensor 312a, the sensor 312b, the sensor 312c, the sensor 312d, the sensor 312e and the sensor 312f and the activation of the sensor 314a and the sensor 314b determine the large size vehicle 322 to not be in the category of the first size type of vehicle. The capturing unit 316c is triggered and takes the image of the large size vehicle 322. The sensor 312a, the sensor 312b, the sensor 312c, the sensor 312d, the sensor 312e and the sensor 312f generate the de-activation information and the sensor 314a and the sensor 314b generate the de-activation information.

Figure 3F:
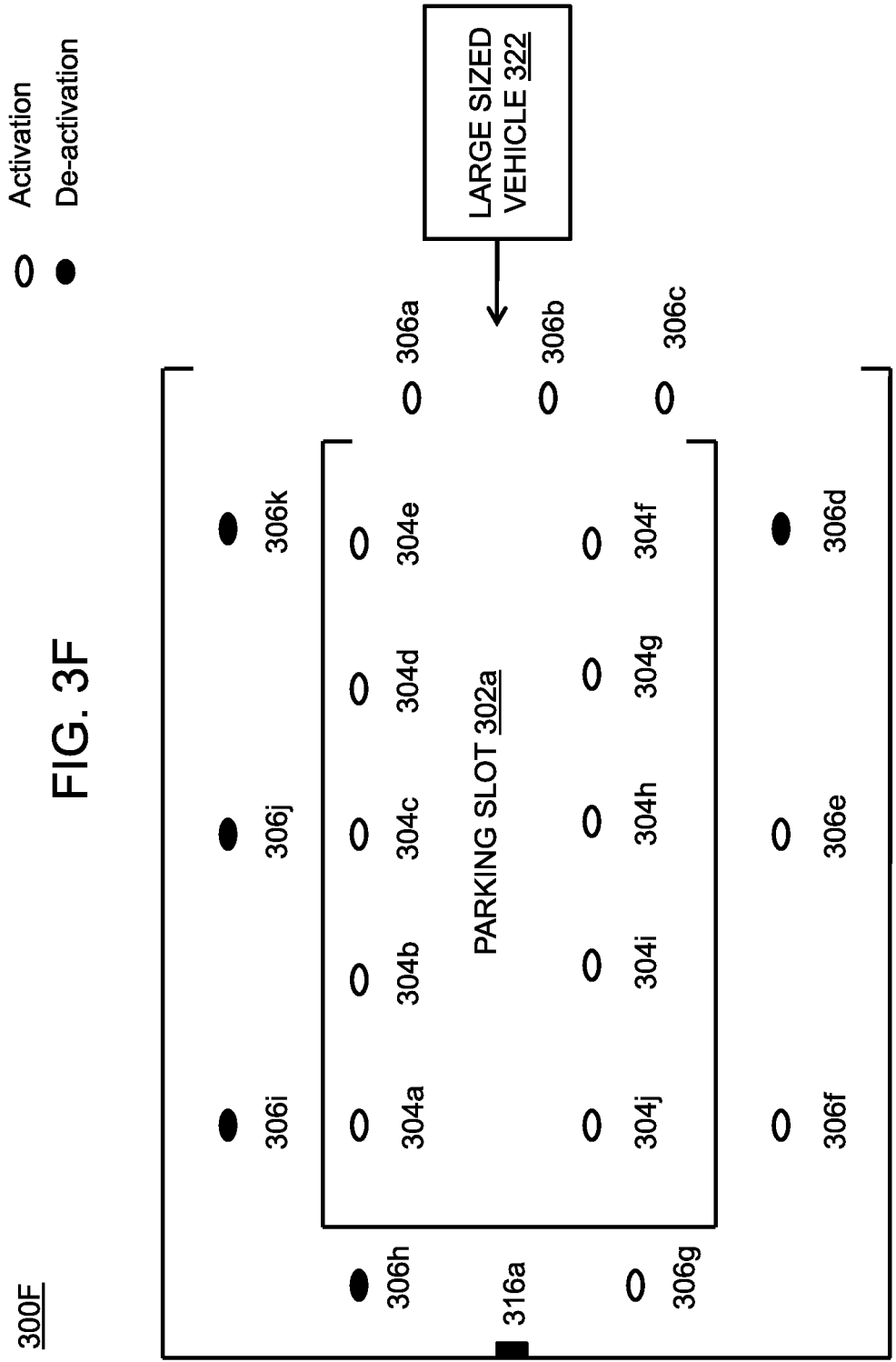

FIG. 3F illustrates a system 300F for showing an example of the parking slot for the third size type of vehicles, in accordance with an embodiment of the present invention. The system 300 includes the parking slot 302a, the first set of sensors 304, the second set of sensors 306, the capturing unit 316a and the large size vehicle 322. The capturing unit 316a is associated with the parking slot 302a. Further, the capturing unit 316a is configured for capturing images of the vehicles wrongly parked or not associated with the size type of the parking slot 302a.

The system 300F depicts the activation and the de-activation status of the first set of sensors 304 and the second set of sensors 306 when the large size vehicle 322 is parked inside the parking slot 302a defined for allowing the parking of the vehicles belonging to the large size type.

Going further, the first set of sensors 304 are positioned inside the parking zone of the parking slot 302a defined for the vehicles of the large size type. The first set of sensors 304 includes the sensor 304a, the sensor 304b, the sensor 304c, the sensor 304d, the sensor 304e, the sensor 304f, the sensor 304g, the sensor 304h, the sensor 304i and the sensor 304j. Moreover, the second set of sensors 306 is positioned on the outer boundary of the parking slot 302a (as exemplary stated above in the detailed description of FIG. 3D and FIG. 3E). The large size vehicle 322 enters the parking slot 302a and the user driving the large size vehicle 322 parks the large size vehicle 322 in the pre-defined parking space made for the large size vehicle 322. The sensor 304a, the sensor 304b, the sensor 304c, the sensor 304d, the sensor 304e, the sensor 304f, the sensor 306a, the sensor 306b, the sensor 306c, the sensor 306d, the sensor 306e and the sensor 306f are activated on detecting the presence of the large size vehicle 322 inside the parking slot 302a. Moreover, the sensor 306g, the sensor 304h, the sensor 304i, the sensor 304j and the sensor 306k remain deactivated due to an absence of the large size vehicle 322 over the outer boundary space equipped with the second set of sensors 306.

The activation of the sensor 304a, the sensor 304b, the sensor 304c, the sensor 304d, the sensor 304e, the sensor 304f, the sensor 306a, the sensor 306b, the sensor 306c, the sensor 306d, the sensor 306e and the sensor 306f and the de-activation of the sensor 306g, the sensor 304h, the sensor 304i, the sensor 304j and the sensor 306k determine the large size vehicle 322 is parked in an inappropriate position. In an embodiment of the present invention, the activation indicates the deviation of the approximate position of the large size vehicle 322 from the allowed position. In yet another embodiment of the present invention, the activation determines that the large size vehicle 322 is not parked properly in its defined parking space in the parking slot 302a.

Furthermore, the capturing unit 316a is triggered and takes an image of the large size vehicle 322. The sensor 304a, the sensor 304b, the sensor 304c, the sensor 304d, the sensor 304e, the sensor 304f, the sensor 306a, the sensor 306b, the sensor 306c, the sensor 306d, the sensor 306e and the sensor 306f generate the activation information and the sensor 306g, the sensor 304h, the sensor 304i, the sensor 304j and the sensor 306k generate the de-activation information.

Figure 4:
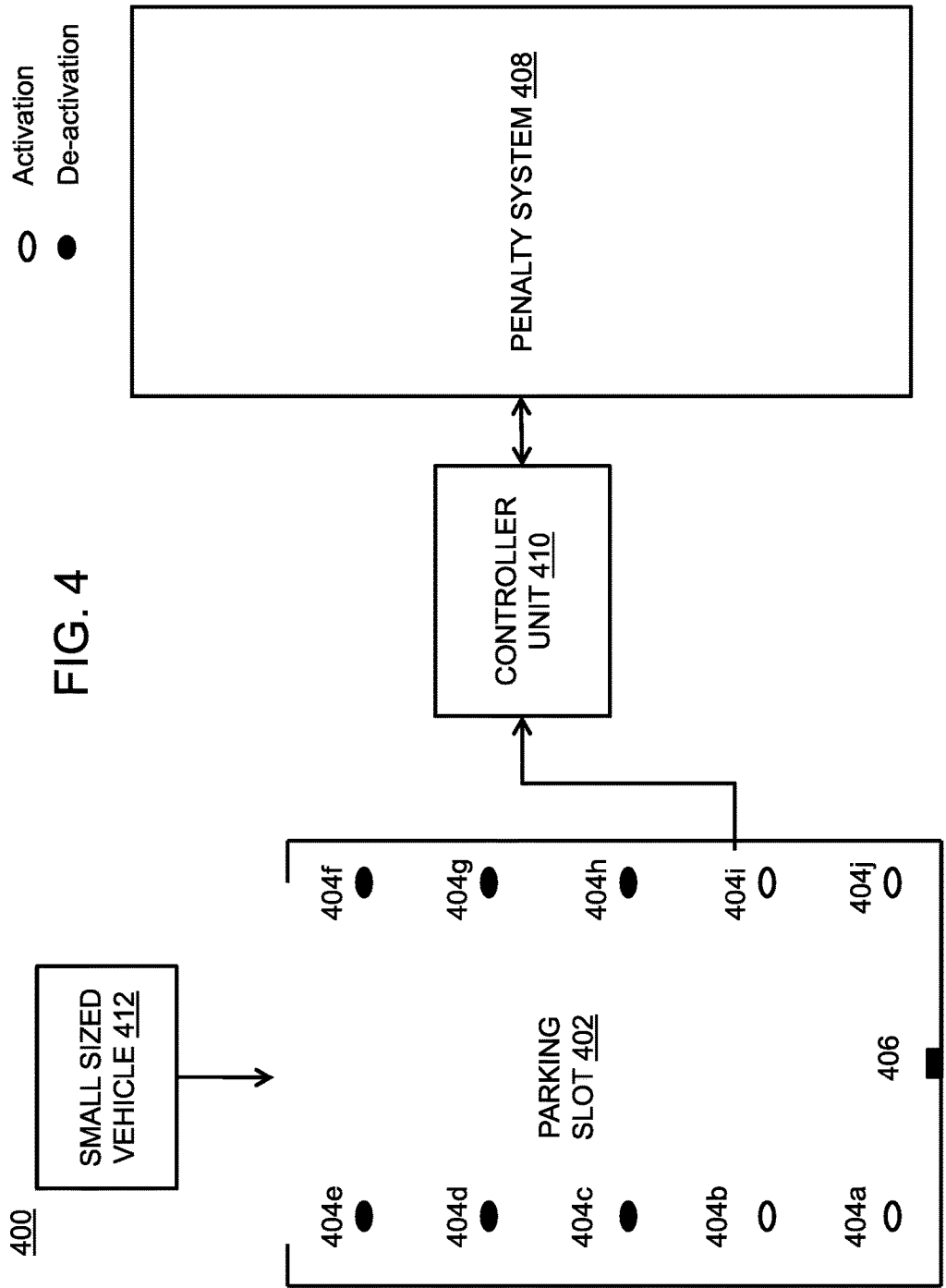
FIG. 4 illustrates a system for issuing a penalty against the vehicle.

FIG. 4 illustrates a system 400 for issuing a penalty against the vehicle, in accordance with an embodiment of the present invention. It may be noted that to explain the system elements of FIG. 4, references will be made to the system elements of FIG. 1, FIG. 2, FIG. 3A, FIG. 3B, FIG. 3C, FIG. 3D, FIG. 3E and FIG. 3F. The system 400 includes a plurality of sensors 404a-j positioned on a parking slot 402, an image acquiring unit 406, a penalty system 408, the controller unit 410 and a small size vehicle 412.

Going further, the parking slot 402 is configured to allow the parking of the vehicles corresponding to the large size type. In an embodiment of the present invention, the size of the parking slot 402 corresponds to the size type of the vehicles. Further, the parking slot 402 includes the plurality of sensors 404a-j. The plurality of sensors 404a-j is positioned at specific slots within the parking slot 402 based on the size type of the vehicle allowed to be parked in the parking slot 402. The plurality of sensors 404a-j is the proximity sensors. The plurality of sensors 404a-g include a sensor 404a, a sensor 404b, a sensor 404c, a sensor 404d, a sensor 404e, a sensor 404f, a sensor 404g, a sensor 404h, a sensor 404i and a sensor 404j. The plurality of sensors 404a-j is configured to detect the presence of the vehicle of the plurality of vehicles parking in the parking slot 402.

Moreover, the plurality of sensors 404a-j in the parking slot 402 is associated with the controller unit 410. In addition, the controller unit 410 is configured for the determination of the size type of the vehicle and the position of the vehicle parked in the parking slot 402. Further, the controller unit 410 determines the approximate position of the vehicle parked in the parking slot 402 based on a pre-configured criterion. The controller unit 410 is associated with the image acquiring unit 406. The image acquiring unit 406 is configured to take the image of the vehicle when the vehicle deviates from the approximate position of the vehicle from the allowed position.

In an embodiment of the present invention, the image acquiring unit 406 takes the image when the vehicle parked in the parking slot 402 does not correspond to the size type of the vehicle allowed to be parked in the parking slot 402. Going further, the controller unit 410 is associated with the penalty system 408. The penalty system 408 is a system for issuing the penalty against the vehicle parked in the parking slot 402. The penalty is issued by the penalty system 408 when the vehicle parked in the parking slot 402 does not correspond to the size type of vehicle allowed to be parked in the parking slot 402. In an embodiment of the present invention, the penalty system 408 issues the penalty based on an output given by the controller unit 410. The output of the controller unit 410 corresponds to the determination of the size type of the vehicle parked in the parking slot 402 and the position of the vehicle parked in the parking slot 402 based on the activation and the de-activation status of the plurality of sensors 404 positioned in the parking slot 402.

The small size vehicle 318 enters the parking slot 402 and the user driving the small size vehicle 318 parks the small size vehicle 318 in the pre-defined parking space made for the vehicles of the large size type. The sensor 404a, the sensor 404b, the sensor 404i and the sensor 404j are activated due to the presence of the small size vehicle 318 on some part of the parking slot 402 covered by the activated plurality of sensors 404. Moreover, the sensor 404c, the sensor 404d, the sensor 404e, the sensor 404f, the sensor 404g and the sensor 404h. are deactivated on detecting the absence of the small size vehicle 318 inside a remaining vacant part of the parking slot 402 covered by the covered by the deactivated plurality of sensors 404.

Furthermore, the controller unit 410 utilizes the activation of the sensor 404a, the sensor 404b, the sensor 404i and the sensor 404j and the de-activation of the sensor 404c, the sensor 404d, the sensor 404e, the sensor 404f, the sensor 404g and the sensor 404h for determining the small size vehicle 412 to not be in the category of the large size type of vehicle. In an embodiment of the present invention, the controller unit 410 determines the size type of the vehicle parked in the parking slot 402 to not match with the size type of vehicle allowed to be parked in the parking slot 402. In another embodiment of the present invention, the controller unit 410 determines a breach by the small size type vehicle 318 parked in the parking slot 402. The controller unit 410 stores the information associated with the activation and the de-activation generated by the plurality of sensors 404 for transmitting it to the penalty system 408. In an embodiment of the present invention, the controller unit 410 stores the activation information of the sensor 404a, the sensor 404b, the sensor 404i and the sensor 404j and the de-activation information of the sensor 404c, the sensor 404d, the sensor 404e, the sensor 404f, the sensor 404g and the sensor 404h.

Moreover, the image capturing unit 406 is triggered based on the determination of the breach by the small size type vehicle 318 parked in the parking slot 402 and takes the image of the small size vehicle 318. In addition, the penalty system 408 issues the penalty against the small size vehicle 318 parked in the parking slot 402 defined for the parking of the vehicles. In an embodiment of the present invention, the penalty system 408 issues the penalty against a person associated with the small size vehicle 318. The penalty may be any amount of money which has to be paid by the person associated with the small size vehicle 318.

Figure 5:
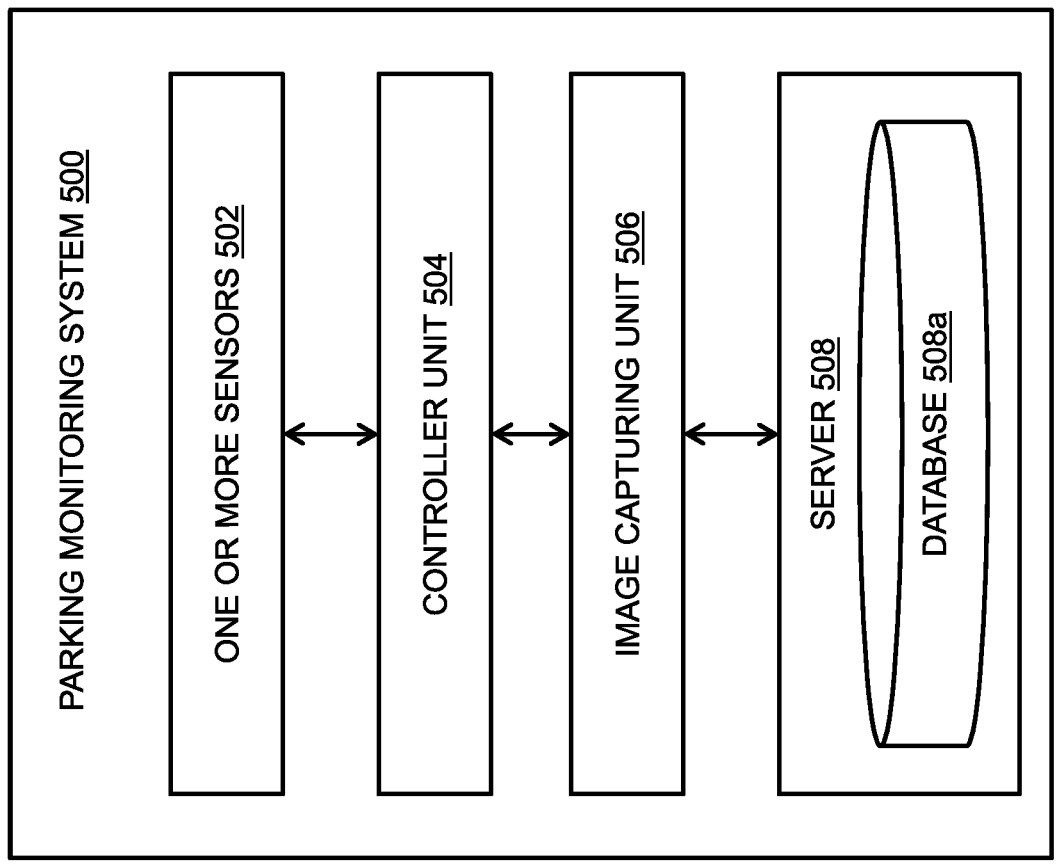
FIG. 5 illustrates a system showing various components of the parking monitoring system.

FIG. 5 illustrates a block diagram of a parking monitoring system 500 showing various components of the parking monitoring system 500, in accordance with an embodiment of the present invention. The parking monitoring system 500 includes one or more sensors 502, a controller unit 504, an image capturing unit 506, a server 508 and a database 508a. The components of the parking monitoring system 100 collectively enable the determining of the size type of the vehicle of the plurality of vehicles parked in the parking slot of the plurality of parking slots of the parking area.

Going further, the one or more sensors 502 are positioned in the each parking slot of the plurality of parking slots. The one or more sensors 502 are positioned and pre-configured for the specific slots within the each parking slot based on the size of the parking slot and the size type of the vehicle allowed to be parked in the parking slot. The one or more sensors 502 detect the presence of the vehicles in the parking slot based on the activation and the de-activation status of the one or more sensors 502.

Moreover, the one or more sensors 502 include a first set of one or more sensors and a second set of one or more sensors. The first set of one or more sensors is positioned inside the each parking slot of the plurality of parking slots. The positioning of the first set of one or more sensors inside the each parking slot is based on the size type of the vehicle allowed to be parked in the parking slot. The first set of one or more sensors is configured to be activated when the vehicle is parked in the parking slot. In an embodiment of the present invention, some of the first set of one or more sensors are activated and the other remaining first set of one or more sensors are deactivated when the vehicle parked in the parking slot corresponds to the size type of vehicle not allowed to be parked in the parking slot.

In addition, the second set of one or more sensors is arranged on the outer boundary of the parking slot. The second set of one or more sensors is configured to be activated when the vehicle is parked in the inappropriate position in the parking slot. In an embodiment of the present invention, the second set of one or more sensors is activated when the vehicle parked in the parking slot corresponds to the size type of vehicle which is larger than the size type of vehicle allowed to be parked in the parking slot. In another embodiment of the present invention, the second set of one or more sensors is activated when the vehicle corresponding to the size type of vehicle allowed to be parked in the parking slot is parked in the inappropriate position.

Further, the controller unit 504 is coupled to the one or more sensors 502. The controller unit 504 receives information from the one or more sensors 502 of the parking slot when the vehicle is parked in the parking slot. The information received by the controller unit 504 corresponds to the activation and the de-activation of the one or more sensors 502. Moreover, the controller unit 504 is configured to determine the size type of the vehicle and the approximate position of the vehicle within the parking slot based on the pre-configured criterion. The pre-configured criterion is based on the received information from the one or more sensors 502 when the vehicle is parked in the parking slot.

In addition, the pre-configured criterion is based on mapping of a stored activation and a stored de-activation signals of the one or more sensors 502 in the parking slot for the each size type of the plurality of vehicles for the each size of the plurality of parking slots with the received activation and de-activation signals of the one or more sensors 502 when the vehicle is parked.

In an embodiment of the present invention, the controller unit 504 analyzes the received activation and de-activation signals for determining the size type of the vehicle parked in the parking slots. The controller unit 504 is further configured to generate a breach notification when the size type of the vehicle allowed in the parking slot is different from the size type of the vehicle parked in the parking slot. The breach notification corresponds to a breach signal generated by the controller unit 504.

Going further, the controller unit 504 is coupled with the image capturing unit 506. The image capturing unit 506 is configured to capture an image of a license plate number of the parked vehicle. The image is captured for the vehicle to transmit the breach notification to at least one of an associated person or a device associated with the vehicle.

In an embodiment of the present invention, the image capturing unit 506 is triggered when the approximate position of the parked vehicle deviates from the allowed position. In another embodiment of the present invention, the image capturing unit 506 is triggered when the size type of the vehicle allowed in the parking slot is different from the size type of the vehicle parked in the parking slot. The image capturing unit 506 may be a digital camera or any other device configured to capture the image of the parked vehicle and transmitting it to the controller unit 504.

The breach notification and the captured image associated with the parked vehicle breaching the parking slot is transmitted to one or more authorities by the controller unit 504 who are authorized for charging the user associated with the parked vehicle in violation with the penalty. The one or more authorities receive the breach notification and the captured image associated with the parked vehicle through a remote control server facilitating one or more administrators administrating the parking slots to take actions against the user associated with the parked vehicle in the violation.

Furthermore, the controller unit 504 is associated with the server 508. The server 508 handles all operations performed by the controller unit 504. The server 508 includes a database 508a. The database 508a is configured to store one or more images of the license plate number of the corresponding plurality of vehicles captured by the image capturing unit 506, the information of the activation and the de-activation of the first set of one or more sensors and the second set of one or more sensors and the size type of vehicle and the approximate position of the vehicle parked in the parking slot determined by the controller unit 504.

It may be noted that in FIG. 5, the image capturing unit 506 is associated with the controller unit 504, however those skilled in the art would appreciate that there are more number of image capturing units associated with the controller unit 504.

FIG. 6 illustrates a flowchart 600 for determining the size type of the vehicle, in accordance with an embodiment of the present invention. It may be noted that references will be made to the system elements of FIG. 5 to explain the flowchart 600. The flowchart 600 initiates at step 602. At step 604, as explained above, the one or more sensors 502 are positioned in the specific slots within the each parking slot. The positioning is based on the size of the parking slot and the size type of the vehicle allowed to be parked in the parking slot. At step 606, as mentioned above, the controller 504 receives information from the one or more sensors 502 of the parking slot when the vehicle is parked in the parking slot. The received information is related to the activation and the de-activation of the one or more sensors 502 in the parking slot. At step 608, the controller 504 determines the size type of the vehicle and the approximate position of the vehicle within the parking slot based on the pre-configured criterion. The pre-configured criterion is based on the received information from the one or more sensors 502 when the vehicle is parked in the parking slot. The flowchart 600 terminates at step 610.

It may be noted that the flowchart 600 is explained to have above stated process steps; however, those skilled in the art would appreciate that the flowchart 300 may have more/less number of process steps which may enable all the above stated embodiments of the present invention.

In another embodiment of the present invention, sensors are positioned in restricted areas where parking is not permitted at all or where parking is reserved for certain categories of people or vehicles such as handicapped people, police, VIP people, ambulances and the like. The presence of any vehicle within these restricted areas is detected by the sensors. The activation of one or more sensors in the restricted areas leads to the generation of detection signals transmitted to the control unit 106. The controller unit 106 determines whether vehicles parked within the restricted areas. In an embodiment of the invention, where parking is strictly restricted, the control unit 106 concludes for a breach in case any vehicle is parked within these areas. An image of the vehicle (or plate number) is taken and sent to the penalty system 408. In case where parking is reserved for certain types of vehicles or people, an image of the vehicle, plate number or any associated information such as special license number is taken and analyzed before a breach decision is concluded. The analysis can be conducted by the control unit 406 or alternatively the image is sent to a server (at the authorities side for example) to determine whether these vehicles are authorized vehicles. In an embodiment of the invention, where a vehicle is parked in a restricted area where parking is strictly restricted, the control unit 106 sends a signal to the penalty system 408 for issuing fine. In another embodiment of the invention, where a vehicle is detected in a restricted zone reserved for special vehicles or people, the image capturing unit 406 is adapted to be triggered at the outset (before a breach is determined) in order to have the image of the vehicle (or any associated information such as a plate number or a license number) for determining whether the parked vehicle is an authorized vehicle before determination of a breach. If a breach is determined, the penalty system 408 issues a penalty against the person associated with the vehicle.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A parking monitoring system comprising:
   one or more sensors configured to be deployed within a parking slot according to a deployment configuration defining each sensor or group of sensors among the one or more sensors to a specific location or zone within the parking slot, wherein the parking slot has a parking slot size and is restricted for vehicles having a permissible size type, the deployment configuration being based on the size of the parking slot and the permissible vehicles size type;
   a controller unit configured to be connected to the one or more sensors for receiving information from the one or more sensors when a vehicle is parked in the parking slot, wherein the received information comprises activation and de-activation signals of the one or more sensors;
   wherein the controller unit is configured to determine a size type of the vehicle parked within the parking slot based on the deployment configuration and on activation and de-activation signals received from the one or more sensors or groups of sensors, and to generate a breach notification when the vehicle size type determined is different from the permissible vehicles size type; and
   an image capturing unit configured to capture an image of a license plate number of the parked vehicle;
   wherein the one or more sensors of the parking slot are a plurality of sensors comprising a first set of sensors and a second set of sensors, the first set of sensors being configured to be deployed within an inner boundary portion of the parking slot and the second set of sensors being configured to be deployed within an outer boundary portion of the parking slot, the inner boundary portion having a size defined based on the vehicles permissible size type, wherein the inner boundary portion and the outer boundary portion are disposed within a same parking slot.

2. The parking monitoring system of claim 1, wherein the controller unit is further configured to determine, based on the activation and de-activation signals received, an approximate position of the vehicle and whether the approximate position determined is a compliant position, and to generate a breach notification when the approximate position determined is not a compliant position.

3. The parking monitoring system of claim 1, wherein the activation of all the sensors of the first set of sensors and the deactivation of all the sensors of the second set of sensors is indicative of presence of a parked vehicle of a permissible size type parked in a compliant position.

4. The parking monitoring system of claim 3, wherein the activation of one or more sensors of the second set of sensors is indicative of a breach.

5. The parking monitoring system as recited in claim 4, wherein the activation of only a part of the sensors of the second set of sensors is indicative of a breach.

6. The parking monitoring system of claim 1, wherein the image capturing unit is adapted to transmit the breach notification to a remote administration unit adapted to issue a fine.

7. The parking monitoring system of claim 1, wherein the parking slot is a restricted area where parking is not permitted or restricted for specific types of people or vehicles.

8. A parking facility deploying the parking monitoring system of claim 1.

9. A parking facility deploying the parking monitoring system of claim 2.

10. A parking facility deploying the parking monitoring system of claim 3.

11. A parking facility deploying the parking monitoring system of claim 4.

12. A parking facility deploying the parking monitoring system of claim 5.

13. A parking facility deploying the parking monitoring system of claim 6.

14. A parking facility deploying the parking monitoring system of claim 7.

* * * * *